(12) United States Patent
Milanowski

(10) Patent No.: US 7,013,754 B2
(45) Date of Patent: Mar. 21, 2006

(54) BICYCLE PEDAL ADAPTER

(76) Inventor: Todd Milanowski, 592 D'Onofrio Dr. Apt. C, Madison, WI (US) 53719

( * ) Notice: Subject to any disclaimer, the term of this patent is extended or adjusted under 35 U.S.C. 154(b) by 485 days.

(21) Appl. No.: 10/417,458

(22) Filed: Apr. 16, 2003

(65) Prior Publication Data

US 2003/0192399 A1    Oct. 16, 2003

Related U.S. Application Data

(63) Continuation of application No. 09/923,890, filed on Aug. 7, 2001, now abandoned.

(51) Int. Cl.
*G05G 1/16* (2006.01)
(52) U.S. Cl. .................................. 74/594.6
(58) Field of Classification Search ............. 74/562, 74/563, 594.1, 594.4–594.7
See application file for complete search history.

(56) References Cited

U.S. PATENT DOCUMENTS

| | | | |
|---|---|---|---|
| 1,388,935 A | 8/1921 | Tamble | |
| 1,972,701 A | 9/1934 | Carlson et al. | |
| 2,548,988 A | 4/1951 | McDonald | |
| 2,751,797 A | 6/1956 | Pearl | |
| 3,964,343 A | 6/1976 | Lauterbach | |
| 4,345,487 A | 8/1982 | Straker | |
| 4,599,914 A | 7/1986 | Dunn et al. | |
| 4,889,010 A | 12/1989 | Ross | |
| 4,942,778 A | 7/1990 | Bryne | |
| D341,108 S | 11/1993 | Chen | |
| 5,398,570 A | 3/1995 | Chae | |
| 5,673,597 A | 10/1997 | Lin | |
| 5,687,619 A | 11/1997 | Bryne | |
| 5,806,379 A | 9/1998 | Nagano | |
| 6,339,972 B1 | 1/2002 | Paris | |

*Primary Examiner*—Chong H. Kim
(74) *Attorney, Agent, or Firm*—Quarles & Brady LLP

(57) ABSTRACT

A bicycle pedal adapter and bicycle pedal assembly is disclosed for use on a bicycle having a crank arm and a clipless bicycle pedal supported by the crank arm, wherein the pedal includes engagement structure engageable with a shoe having complementary structure for fixing the shoe to the pedal. In one embodiment, the bicycle pedal adapter includes a first portion engaging the clipless bicycle pedal and covering at least a portion of the engagement structure to eliminate the need for the shoe having the complementary structure. A second portion is coupled to the first portion. The clipless bicycle pedal is received in a cavity defined between the first and second portions. At least one engagement surface is formed on at least one of the first and second portions, wherein the at least one engagement surface is engageable with a shoe not having the complementary structure to pedal the bicycle.

16 Claims, 4 Drawing Sheets

BICYCLE PEDAL ADAPTER

CROSS REFERENCES TO RELATED APPLICATIONS

This application is a continuation of U.S. patent application Ser. No. 09/923,890 filed on Aug. 7, 2001, now abandoned.

STATEMENT REGARDING FEDERALLY SPONSORED RESEARCH

Not Applicable

TECHNICAL FIELD OF THE INVENTION

This invention relates to the field of bicycles and more specifically to a pedal adapter.

BACKGROUND

Many bicycle riders prefer to use clipless bicycle pedals for racing and operation over rough terrain. Clipless bicycle pedals are bicycle pedals that have locking mechanisms that can engage the cleats on the bottom of special shoes worn by a bicycle rider. This allows for a tight fit between the shoes of the user and the clipless bicycle pedal. This provides for efficient pedaling when the special bicycle shoes are worn.

However, often times a bicycle rider may wish to go on a short trip or a relaxing ride and may not want to wear special bicycle shoes. In order to do this the bicycle rider is required to either change bicycle pedals, a time consuming process, or use a different bicycle, which is costly. What is needed is an inexpensive way to convert a clipless bicycle pedal to a standard bicycle pedal.

SUMMARY OF THE INVENTION

The present invention provides a bicycle pedal adapter and bicycle pedal assembly for use on a bicycle having a crank arm and a clipless bicycle pedal supported by the crank arm, wherein the pedal includes engagement structure engageable with a shoe having complementary structure for fixing the shoe to the pedal. In one embodiment, the bicycle pedal adapter includes a first portion engaging the clipless bicycle pedal and covering at least a portion of the engagement structure to eliminate the need for the shoe having the complementary structure. A second portion is coupled to the first portion. The clipless bicycle pedal is received in a cavity defined between the first and second portions. At least one engagement surface is formed on at least one of the first and second portions which is engageable with a shoe not having the complementary structure.

A general objective is to provide an adapter for a bicycle pedal which eliminates the need for a special shoe. This objective is accomplished by providing an adapter which is fixed to a pedal by sandwiching the pedal between two adapter portions to eliminate the need for special shoes.

Technical advantages of the present invention include the ability to ride a bike without special shoes. Other technical advantages are apparent from the following descriptions, illustrations and claims.

BRIEF DESCRIPTION OF THE DRAWINGS

For a more complete understanding of the present invention and advantages thereof, reference is now made to the following descriptions, taken in conjunction with the following drawings, in which like reference numerals represent like parts, and in which.

DETAILED DESCRIPTION OF THE DRAWINGS

Figure 1:
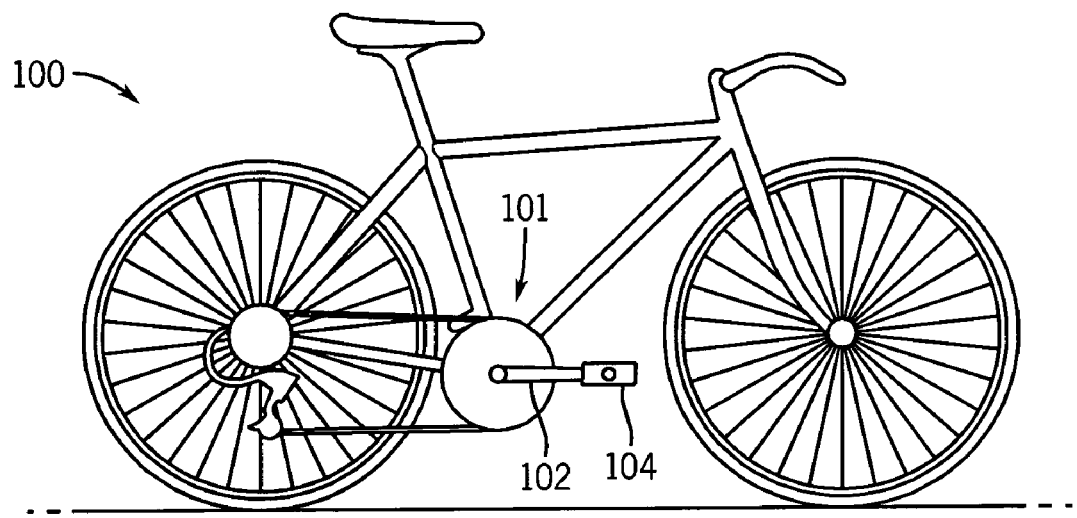
FIG. 1 is a drawing of a bicycle illustrating a pedal assembly having a crank arm that supports a clipless pedal.
Figure 2:
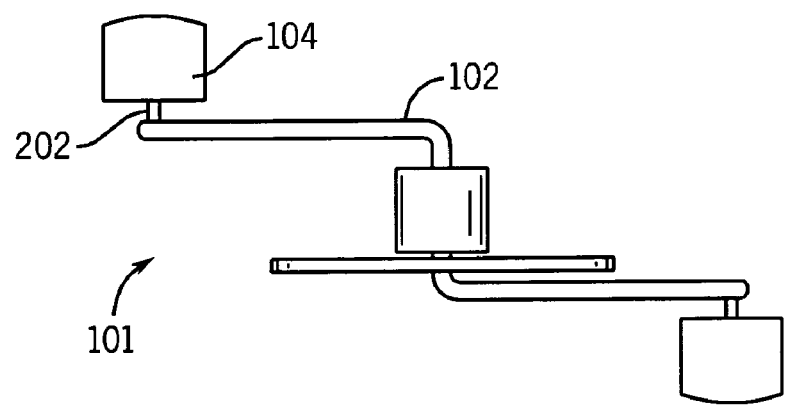
FIG. 2 is a view of the pedal body of FIG. 1.

Referring to FIGS. 1–4 a bicycle 100 includes a pedal assembly 101 having a crank arm 102 that supports a clipless pedal 406. The clipless pedal 406 is rotatably coupled to the crank arm 102 by a pedal shaft 202, and includes engagement structure 408 which requires a special shoe. A pedal adapter 104 is placed over the clipless pedal 406 to allow the user to operate bicycle 100 without the need of special cleated shoes.

Figure 3:
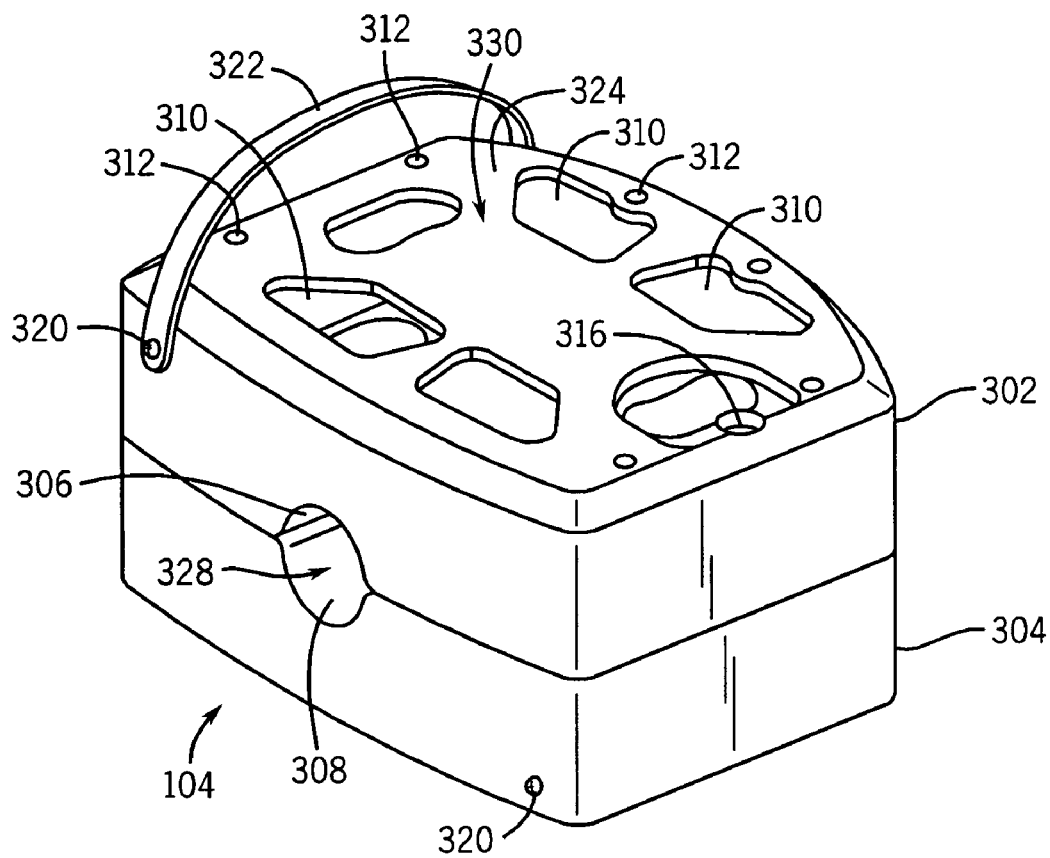
FIG. 3 is a perspective view of a pedal adapter incorporating the present invention for use on the pedal assembly of FIG. 2.
Figure 4:
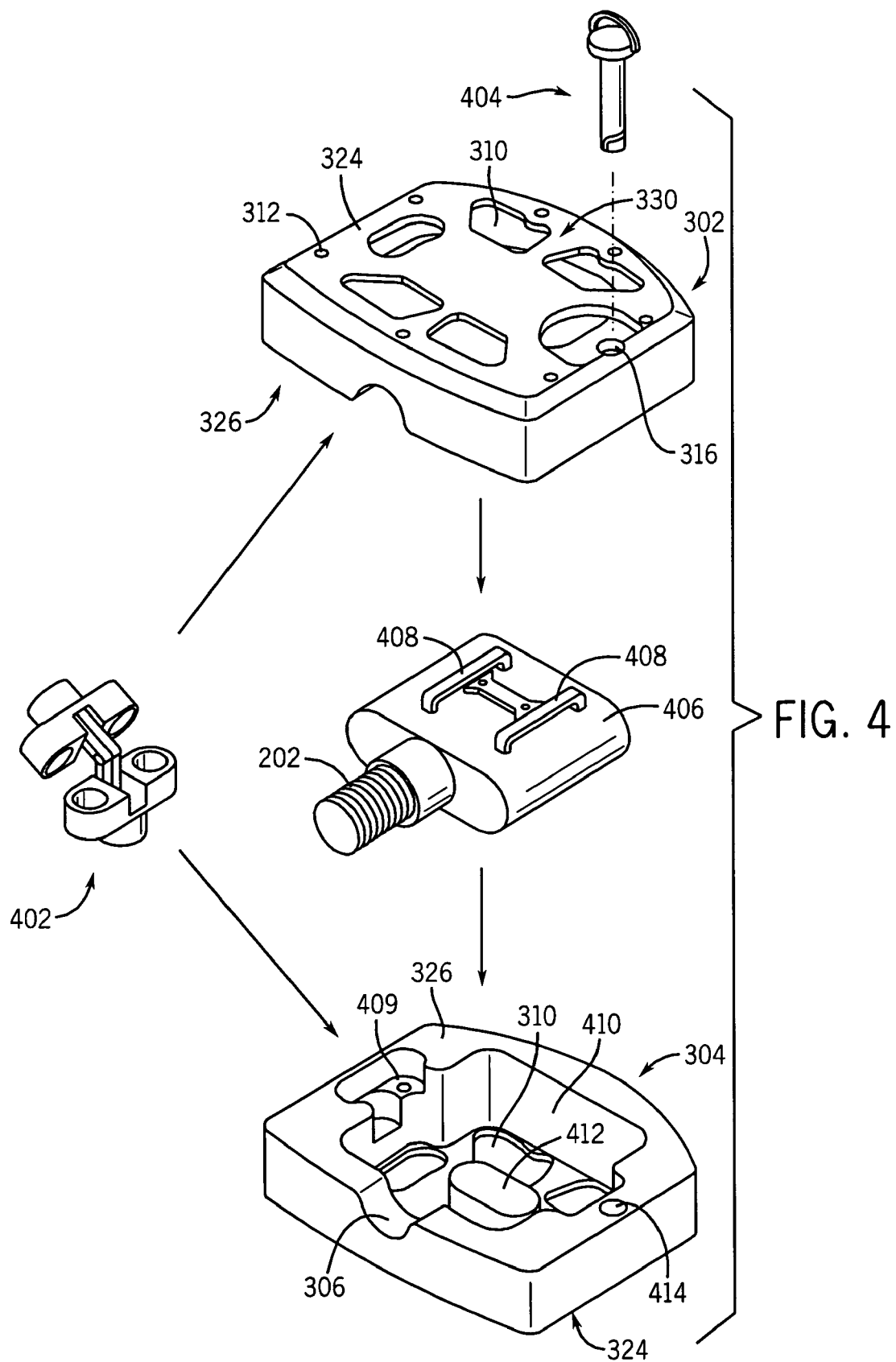
FIG. 4 is an exploded view of the bike pedal adapter of FIG. 3.

Referring to FIGS. 3 and 4, the pedal adapter 104 is attached to the pedal 406 and covers, or otherwise renders inoperable, the engagement structure 408 to eliminate the need for the special shoe. The adapter is fixed to the pedal by sandwiching the pedal 406 between the top and bottom adapter portions 302, 304 joined by a hinge 402. Preferably, the top and bottom portions 302, 304 enclose the clipless pedal sandwiched therebetween.

The hinge 402 couples the top portion 302 and bottom portion 304 in a clam-shell fashion to allow the portions 302, 304 to be easily slipped around the pedal 406. The hinge 402 can be molded to the top portion 302 and bottom portion 304, screwed into the top portion 302 and bottom portion 304, or coupled to the top portion 302 and bottom portion 304 in any other fashion. Although a hinge 402 is preferred, it is not required, and the top portion 302 and bottom portion 304 can be secured to the pedal 406 by two or more latching devices.

Each adapter portion 302, 304 includes an outwardly facing 324 side having a user engagement surface 330 for engagement by the user to pedal the bicycle 100 and an inwardly facing side 326 which engages the pedal 406. When the pedal 406 is enclosed by the top and bottom portions 302, 304, the pedal shaft 202 extends through a cylindrical shaft opening 328 defined by semicircular shaft openings 306, 308 formed in the top portion 302 and bottom portion 304. The shaft opening 328 is sized to allow the pedal adapter 104 to rotate with the clipless pedal 406, and thus, not impede pedaling the bicycle 100 or free rotation of the pedal 406.

A number of through holes 310 are formed in the adapter portions 302, 304 to decrease the weight of pedal adapter 104 and allow for water and mud to escape through openings 310. Advantageously, a lanyard or cable can be passed through the holes 310 to secure the bicycle 100.

Traction screw holes 312 are formed in the outwardly facing engagement surfaces 324 for accepting traction screws 313. Traction screws are small pieces of plastic or metal that may be inserted into traction screw openings 312 to inhibit slippage between a user's shoe and the pedal adapter 104.

The number and position of traction screw holes 312 and through holes 310 are shown for illustrative purposes only and can be placed in other arrangements. Moreover traction screws can be molded directly into the outwardly facing surfaces of the top and bottom portions without departing from the scope of the present invention. In addition, other traction mechanisms, such as grooves (not pictured) can be formed in the engagement surfaces in place of or with traction screws to help a shoe stay on the pedal adapter without departing from the scope of the present invention.

A top lock opening 316 extending through the top portion 302 is aligned with a bottom lock opening 414 extending into the bottom portion 304 for accepting a locking screw 404. The locking screw 404 extends through the top lock opening 316 and threadably engages the bottom lock opening 414 to secure the top portion 302 to the bottom portion 304. Preferably, the locking screw 404 is a quarter turn screw. A quarter turn screw is convenient because it can be removed and replaced without a special tool. Although a quarter turn screw can be used, it is appreciated by those skilled in the art that any other similar latching devices that can secure top and bottom portions may be utilized such as a clip.

Figure 5:
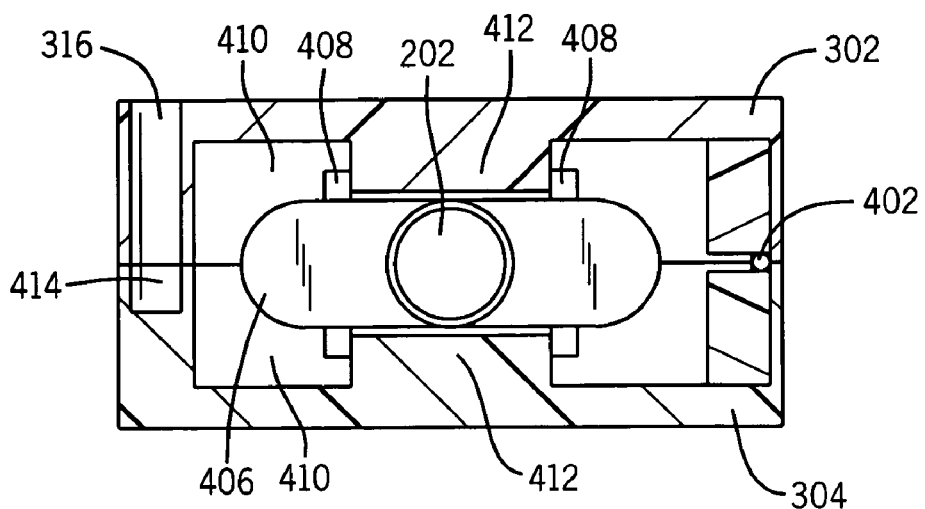
FIG. 5 is a cross sectional view of the bike pedal adapter of FIG. 3.

As shown in FIGS. 4 and 5, the pedal 406 is received in pedal cavities 410 formed in the inwardly facing sides 326 of the top and bottom portions 302, 304. Advantageously, positioning the pedal 406 in the cavities 410 completely covers the pedal engagement structure 308 to eliminate the need for special shoes. Although cavities 410 formed in both adapter portions 302, 304 is disclosed, a cavity for receiving the pedal can be formed in only one portion, or the portions can be formed without cavities and the pedal is sandwiched between the portions to allow use of the pedals without engaging the pedal engagement structure with special shoes, without departing from the scope of the present invention.

The inwardly facing sides 326 include a boss 412 which extends inwardly toward the pedal 406 from the inside each cavity 410. The boss 412 securely engages the clipless pedal 406 by exerting pressure on the clipless pedal 406 when enclosed in the adapter 104. In one embodiment, the boss 412 is coated with a friction enhancing material, such as a fabric, rubber or other elastomeric material, and the like, in order to reduce relative movement between the pedal 406 and adapter 104. Of course, friction enhancing material can also be applied directly to other portions of the inwardly facing side 326 of the adapter 104 for engagement with the pedal 406 without departing from the scope of the invention. Advantageously, due to the secure hold on the clipless pedal 406 by the adapter portions 302, 304, the entire pedal adapter 104 can rotate about shaft 202 in the same fashion as the pedal 406.

Preferably, a hinge receptacle 409 is formed in each adapter portion 302, 304 for receiving an end of the hinge 402. Although a hinge cavity is preferred, a hinge, if provided, can be attached to a surface of each of the portions without departing from the scope of the present invention.

As shown in FIG. 3, a toe strap 322 can be secured to the pedal adapter 104 via toe strap screws 320. The toe strap 322 secures a user's foot to the pedal adapter 104. Toe strap 322 may be mounted to either portion 302, 304 of the pedal adapter 104.

In operation, a user fixes an adapter to a pedal by disengaging the locking screw 404 from the adapter 104 to at least partially separate the adapter portions 302, 304, and positioning the pedal 406 between the portions 302, 304 in one of the portion pedal cavities 410. The user then joins the adapter portions 302, 304 together to sandwich the pedal 406 between the portions 302, 304, and inserts the locking screw 404 through the top locking opening 316 and into the bottom locking opening 414. The locking screw 404 is turned to threadably engage the bottom locking opening 414 to lock the adapter portions 302, 304 together. If desired, traction screws can be inserted into traction screw openings 312 to allow for secure contact between the pedal adapter 104 and the user's shoes.

Figure 6:
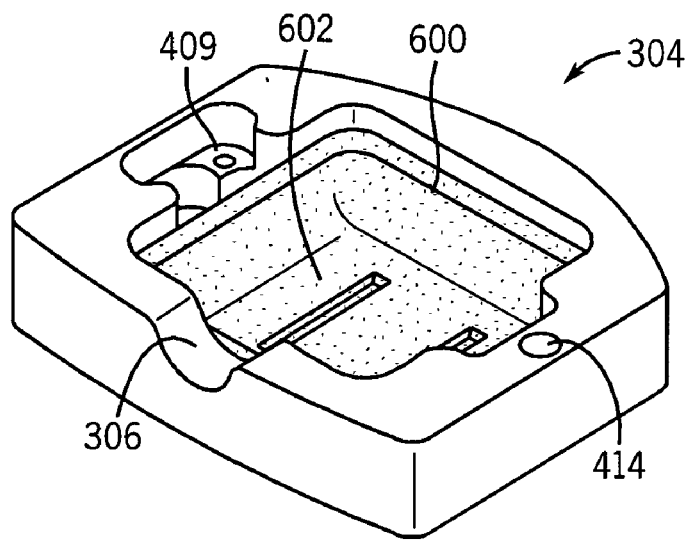
FIG. 6 is a perspective view of a bottom portion of a bike pedal adapter incorporating the present invention and showing an alternative means to secure a clipless pedal with an insert.
Figure 7:
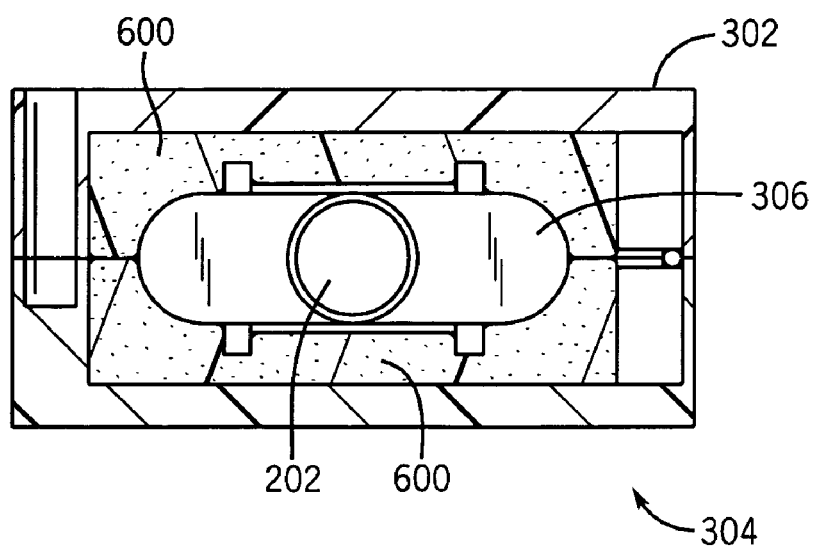
FIG. 7 is a cross sectional view of the bike pedal adapter of FIG. 6, and having a removable insert.

An alternative bottom portion 304, shown in FIGS. 6 and 7, includes a clipless pedal insert 600. In this embodiment, instead of using a raised boss to press against the clipless pedal, an insert 600 is placed inside the adapter cavity 410. The insert 600 includes a form fit portion 602, which is formed to conform to the shape of a particular pedal. Conforming the insert to the pedal prevents relative movement between the pedal and adapter to securely hold on to clipless pedal 406. The form fit pedal insert 600 may be manufactured from rubber, plastic, foam or similar material.

Different manufacturers produce clipless pedals of different designs. Thus, an insert 600 may fit one manufacturers pedal, such as Shimano but not another brand, such as Time. To alleviate this problem, insert 600 is designed to be removable from the inside of bottom portion 304 and the inside of top portion 302 and replaced with an insert 600 that is designed for the type of pedal. This results in a great saving to the user who switches clipless pedals 406. Although a removable insert is preferred, the insert 600 can also be permanently affixed to the pedal adapter 104 without departing from the scope of the present invention. While inserts can be manufactured for specific brands of clipless pedals, it will be appreciated by those skilled in the art that a universal insert can be made from foam or other material.

Thus an improved pedal adapter 104 has been presented. The approved pedal adapter 104 can completely cover and secure a bicycle pedal, such as a clipless pedal. The pedal adapter 104 is lightweight and can be quickly installed and removed. While the invention has been particularly shown and described in the foregoing detailed description, it will be understood by those skilled in the art that various other changes in form and detail may be made without departing from the spirit and scope of the invention.

I claim:

1. A bicycle pedal assembly for use on a bicycle, said bicycle pedal assembly comprising:
   a crank arm;
   a clipless bicycle pedal rotatably supported by said crank arm, said pedal including engagement structure engageable with a shoe having complementary structure for fixing the shoe to the pedal to pedal the bicycle;
   a pedal adapter including first and second portions sandwiching said clipless bicycle pedal therebetween and covering at least a portion of said engagement structure to eliminate the need for the shoe having the complementary structure, each of said first and second portions including at least one engagement surface engageable with a shoe not having the complementary structure to pedal the bicycle regardless of the rotation orientation of said clipless bicycle pedal.

2. The bicycle pedal assembly as in claim 1, in which said pedal adapter includes a hinge coupling said first portion and second portions together in a clam shell fashion.

3. The bicycle pedal assembly as in claim 1, in which a latching device secures said first portion relative to said second portion.

4. The bicycle pedal assembly as in claim 1, in which at least one of said engagement surfaces includes a traction mechanism.

5. The bicycle pedal assembly as in claim 4, in said traction mechanism is at least one traction screw.

6. The bicycle pedal assembly as in claim 1, in which at least one through hole is formed through said pedal adapter such that a cable can be passed through said through hole to assist in securing the bicycle when the bicycle is not in use.

7. The bicycle pedal assembly as in claim 1, in which at least one insert is positioned between said first and second portions for engagement with said engagement structure.

8. The bicycle pedal assembly as in claim 7, in which said insert includes a form fit portion which is formed to conform to the shape of a particular brand of clipless bicycle pedal.

9. A bicycle pedal adapter for use on a bicycle having a crank arm and a clipless bicycle pedal rotatably supported by the crank arm, wherein the pedal includes engagement structure engageable with a shoe having complementary structure for fixing the shoe to the pedal to pedal the bicycle, said bicycle pedal adapter comprising:

a first portion engageable with the clipless bicycle pedal and covering at least a portion of the engagement structure to eliminate the need for the shoe having the complementary structure;

a second portion coupled to said first portion, and defining a cavity between said first and second portions, wherein the clipless bicycle pedal is received in said cavity and sandwiched between said first and second portions to fix said adapter to said clipless bicycle pedal and enclose said clipless bicycle pedal between said first and second portions; and at least one engagement surface formed on each of said first and second portions, wherein said engagement surfaces are engageable with a shoe not having the complementary structure for pedaling the bicycle regardless of the rotation orientation of said clipless bicycle pedal.

10. The bicycle pedal adapter as in claim 9, in which a hinge couples said first portion and second portions together in a clam shell fashion around said clipless bicycle pedal to enclose said clipless bicycle pedal.

11. The bicycle pedal adapter as in claim 9, in which a latching device secures said first portion relative to said second portion.

12. The bicycle pedal adapter as in claim 9, in which at least one of said engagement surfaces includes a traction mechanism.

13. The bicycle pedal assembly as in claim 12, in said traction mechanism is at least one traction screw.

14. The bicycle pedal adapter as in claim 9, in which at least one through hole is formed through said first and second portions such that a cable can be passed through said through hole to assist in securing the bicycle when the bicycle is not in use.

15. The bicycle pedal adapter as in claim 9, in which at least one insert is positioned between said first and second portions for engagement with said engagement structure.

16. The bicycle pedal adapter as in claim 15, in which said insert includes a form fit portion which is formed to conform to the shape of a particular brand of clipless bicycle pedal.

* * * * *